Figure 4:
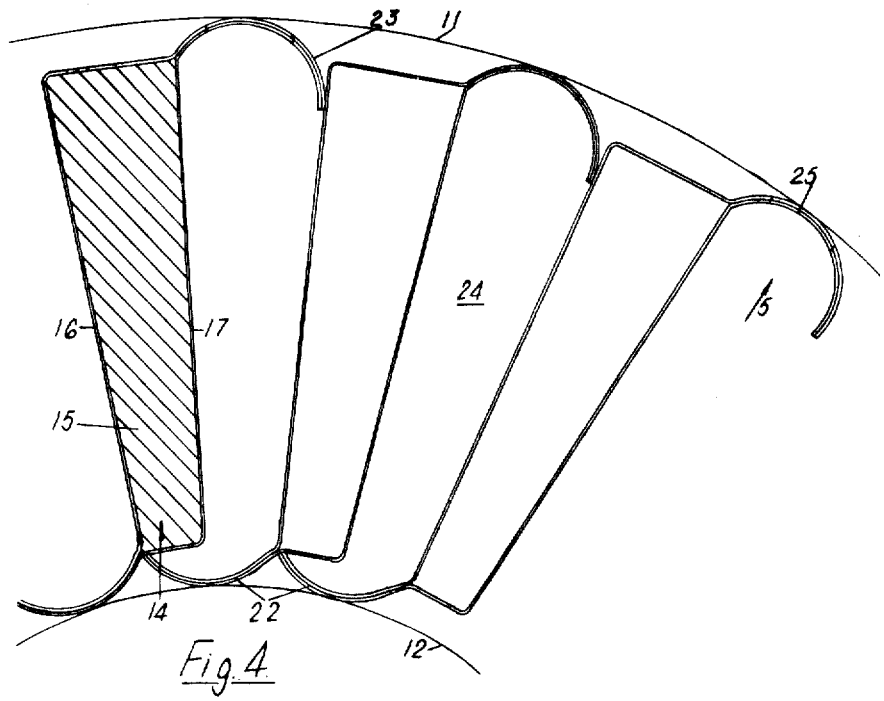

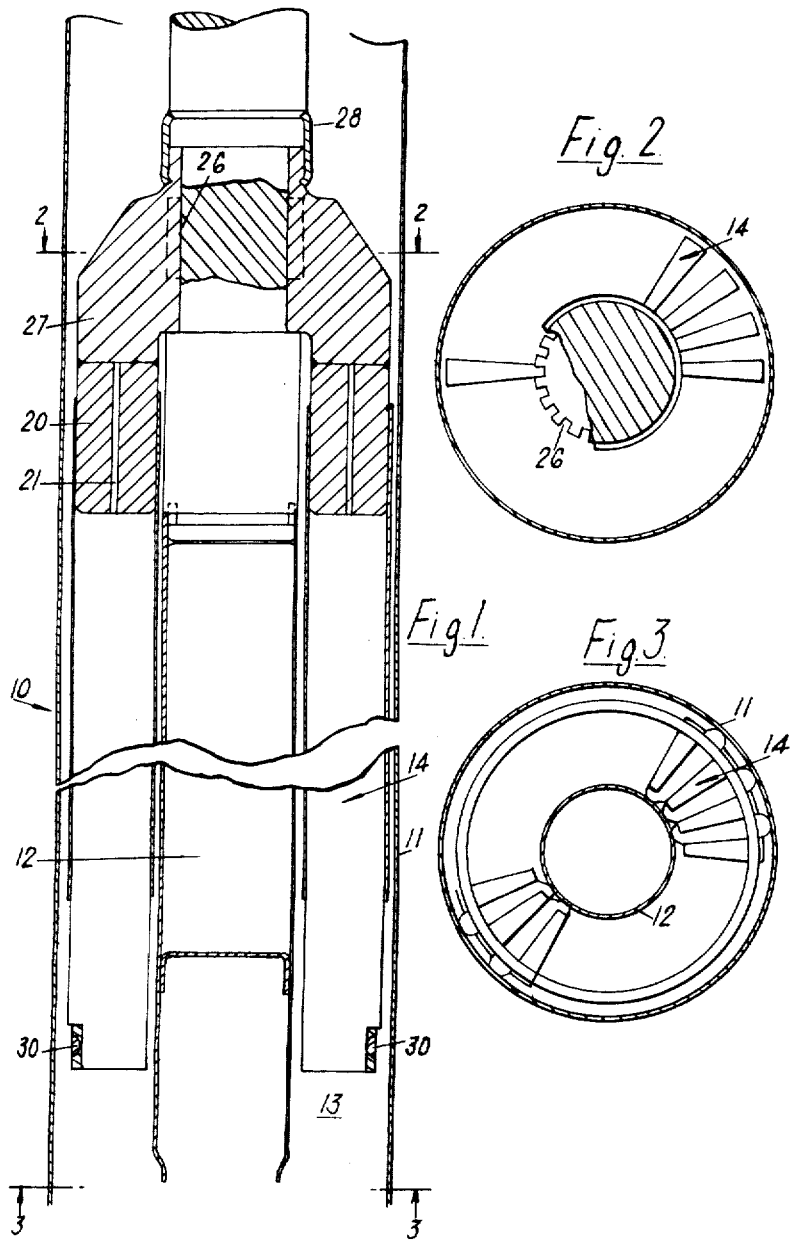

Nov. 30, 1965  S. G. BAUER  3,220,927
FUEL ELEMENTS FOR NUCLEAR REACTORS

Filed Oct. 8, 1962  3 Sheets-Sheet 2

Inventor
STEFAN GEORGE BAUER

By Cushman, Darby & Cushman
Attorneys

Nov. 30, 1965  S. G. BAUER  3,220,927
FUEL ELEMENTS FOR NUCLEAR REACTORS
Filed Oct. 8, 1962  3 Sheets-Sheet 3

Inventor
STEFAN GEORGE BAUER

By
Cushman, Darby & Cushman
Attorneys 3,220,927
FUEL ELEMENTS FOR NUCLEAR REACTORS
Stefan George Bauer, Willowpit, Hilton, Derby, England, assignor to Rolls-Royce Limited, Derby, England, a company of Great Britain
Filed Oct. 8, 1962, Ser. No. 229,025
Claims priority, application Great Britain, Oct. 13, 1961, 36,899/61
3 Claims. (Cl. 176—76)

This invention relates to fuel elements for nuclear reactors.

Uranium oxide fuel elements contained in stainless steel cans are well known but when used at high temperature suffer from bad thermal shock effects.

Disadvantages, moreover, arise from the low thermal conductivity of uranium oxide elements. They are subject to cracking and the mechanical stability of the fuel element is largely dependent on the characteristics of the can.

Uranium mono-carbide or uranium nitride would be more satisfactory for high temperature work if it were possible to bond the uranium mono-carbide or nitride satisfactorily to a can.

According to the present invention there is therefore provided a fuel element for a nuclear reactor comprising a mass of fissile material encased in and metallically bonded to the internal wall of a sheet metal can or sheath, the metallic bond between the said mass and the said internal wall having a low neutron absorption and a melting point above the temperature to which the fuel element will be subjected in operation, the metallic bond having substantially no chemical attack on the sheet metal can or sheath at the said temperature.

By metallically bonding the fissile material to the internal wall of the can or sheath any damage due to pin holes or cracks in the can or sheath would be localised.

Preferably the fissile material comprises one or more of the following materials: uranium metal; a uranium alloy; a uranium compound; and a dispersion of uranium metal, a uranium alloy, or a uranium compound in a non-fissile material (e.g. a ceramic material). Thus the uranium compound may be uranium mono-carbide, or uranium nitride, or uranium dioxide.

The said mass may be brazed to the said internal wall.

The term "brazing" is used in this specification in a broad sense to include the use of metals, such as nickel, and alloys. One suitable alloy is a nickel-phosphorus alloy which contains 11% phosphorus and 89% nickel and which melts at about 880° C.

Another suitable alloy is a copper-aluminum alloy with 5–8% aluminum melting at about 1050° C.

Known nickel base brazing alloys containing the following elements may moreover be used in said brazing:

Silicon
Phosphorus
Chromium
Manganese
Iron

The can or sheath (and hence the said mass) may be of circular or oval cross section.

The said mass is, however, preferably so shaped as to have a surface area substantially larger (e.g. at least 50% larger) than that of a cylindrical mass having the same volume. Thus the said mass may be wedge-shaped.

Preferably the mass consists of a plurality of members of like shape, each said member being bonded to the internal wall of the can or sheath and to the adjacent member or members. In this case, the metallic bonding may be effected by employing a thin foil of brazing material inside the can or sheath and around each said member.

The can or sheath, which should desirably have good corrosion resistance in the reactor coolant at the operating temperature, may be made in a plurality of parts which are welded or otherwise bonded together.

The can or sheath is preferably provided with projections which may be used to space the fuel element from adjacent fuel elements and/or from the walls of a housing or the like within which the fuel element may be disposed.

Preferably the can or sheath is initially made larger than said mass and is collapsed into contact therewith, the excess metal of said can or sheath resulting from said collapsing being formed into at least parts of the said projections.

Figure 5:
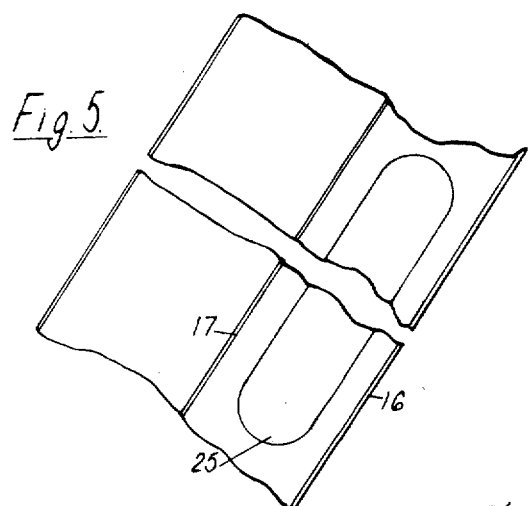
Figure 6:
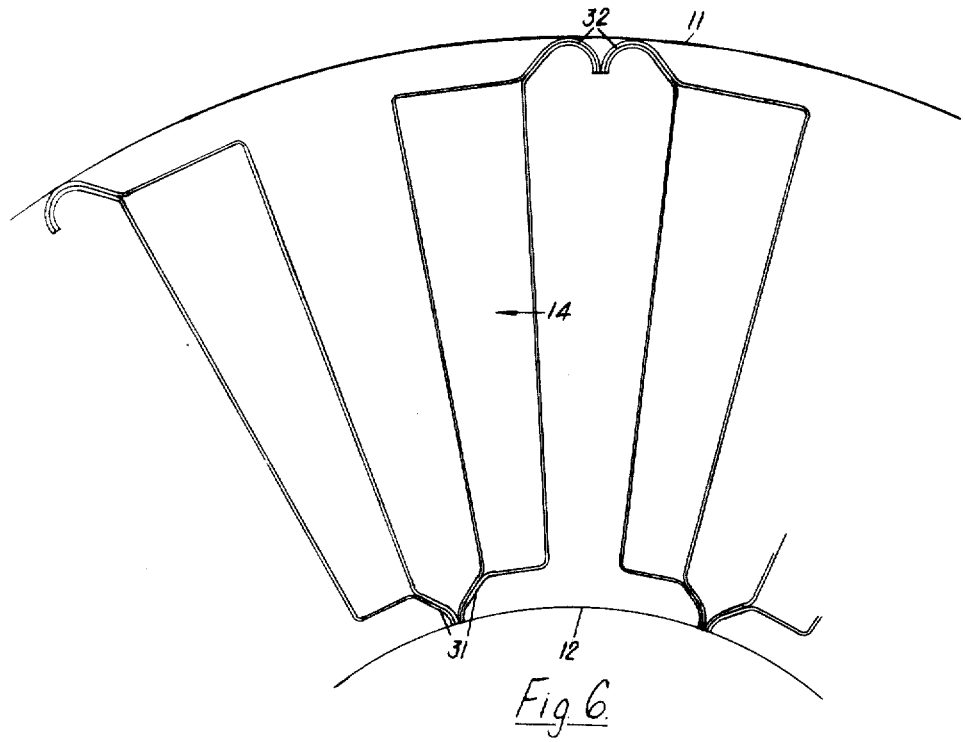
Figure 7:
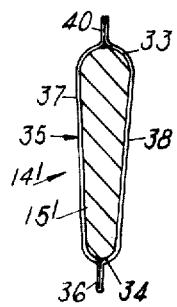

The invention is illustrated, merely by way of example, in the accompanying drawings, in which:

FIGURE 1 is a broken away longitudinal section through a coolant channel of a nuclear reactor, the said coolant channel being provided with fuel elements according to the present invention, FIGURES 2 and 3 are cross sections taken respectively on the lines 2—2 and 3—3 of FIGURE 1, FIGURE 4 is a broken away cross section showing part of the structure illustrated in FIGURE 3 on a larger scale, FIGURE 5 is a broken away view looking in the direction of the arrow 5 of FIGURE 4, FIGURE 6 is a view similar to FIGURE 4 but illustrating a modification, and FIGURE 7 is a section through a modified fuel element according to the invention.

Referring first to FIGS. 1–5, a coolant channel 10 of a nuclear reactor comprises an outer barrier tube 11 within which an internal plug 12 is concentrically mounted, the plug 12 being spaced from the tube 11 by an annular space 13 through which coolant may flow.

Within the annular space 13 there are mounted a plurality (e.g. twenty) of angularly spaced apart fuel elements 14.

Each of the fuel elements 14 comprises a wedge-shaped mass 15 (FIG. 4) which is encased in a sheet metal can or sheath, the latter being in two sheet metal parts 16, 17 which are welded together. The sheet metal parts 16, 17 may be made of stainless steel or of a nickel alloy (e.g. those sold under the registered trademarks "Inconel" or "Nimonic 75") and may be of the order of 0.005" to 0.010" in thickness.

The wedge-shaped mass 15 consists of a plurality of wedge-shaped plates (not shown) which are bonded to each other and to the sheath 16, 17, each of the wedge-shaped plates being formed from a fissible material, e.g. a mixture of a ceramic material with uranium mono-carbide, uranium nitride or uranium dioxide.

Each of the fuel elements 14 is provided at its upper end with a metal plug 20 having a passage 21 therethrough to permit evacuation of the element, the plug 20 being disposed in contact with the mass 15 and being partly encased in the sheath 16, 17.

The internal wall of the sheath 16, 17 may be provided electrolytically with a nickel deposit, each of the wedge-shaped plates being provided at its surface with a vapour deposited nickel film.

The parts 16, 17 of the sheath are initially made to enclose a volume larger than that of the mass 15 of wedge-shaped plates.

A high vacuum is maintained in the interior of each of the fuel elements by evacuation through the respective passage 21, the high vacuum being employed to ensure the removal of oxygen. The fuel elements are placed in a furnace under external, pneumatically applied, pressure (e.g. of 300–500 pounds per square inch).

The application of the said external pressure causes the parts 16, 17 to be collapsed tightly against the mass 15.

The temperature within the furnace is raised to between 800° C. to 1050° C. for 10 to 20 minutes so that a metallic diffusion bond is formed between the nickel surfaces on the sheath and wedge-shaped plates. No melting of the nickel surfaces occurs during this process and an inert or reducing atmosphere is used within the furnace so that there is no corrosive attack on the sheath 16, 17.

Alternatively, the bonding of the wedge-shaped plates to each other and to the sheath 16, 17 may be effected after providing (e.g. by a chemical process) the internal wall of the sheath with a deposit of about 0.001" of the above-mentioned nickel-phosphorus alloy, wedge-shaped plates being provided with a film of evaporated nickel deposit. In this case, the bonding operation should be carried out at a temperature of substantially 900° C. to 1000° C.

Before the bonding operation has been completed, the excess metal from the parts 16, 17, resulting from the collapsing of the sheath against the mass 15, is formed into (and the parts 16, 17 are resistance welded together at) two, diametrically oppositely disposed, part-cylindrical projections or "tails" 22, 23. As will be clearly seen from FIGURE 4, each of the tails 22 contacts both the internal plug 12 and the adjacent fuel element 14 to one side thereof so as to space the respective fuel element 14 therefrom. Similarly, each of the tails 23 contacts the outer barrier tube 11 and the adjacent fuel element 14 to the other side thereof so as to space the respective fuel element 14 therefrom.

The tails 22, 23 thus serve to space the fuel elements 14 from each other by spaces 24 which have a similar cross-sectional shape to that of the fuel elements 14. The spaces 24 form part of the annular space 13 and are adapted for the passage of steam therethrough.

The tails 23 are provided with slots 25 to ensure equalisation of the pressures in the spaces 24.

The internal plug 12 is formed with a plurality of angularly spaced apart grooves 26 into each of which is placed an element support member 27 which is welded to the top of the respective plug 20 of a fuel element 14.

Atfer the fuel elements 14 have been so hung from the internal plug 12, a clamp ring 28 is passed over the internal plug 12 so as to surround the upper ends of the element support members 27, the clamp ring 28 being then swaged in position as shown in FIGURE 1.

Two diametrically oppositely disposed fuel elements 14 are engaged at their lower ends by positioning members 30 so as to limit undue movement of the lower ends of the fuel elements.

In FIGURE 6 there is shown a modification of the invention in which each of the fuel elements 14 is provided with two diametrically oppositely disposed curved tails 31, 32. Each of the tails 31 contacts both the internal plug 12 and the tail 31 of the fuel element 14 to one side thereof, while each of the tails 32 contacts both the outer barrier tube 11 and the tail 32 of the fuel element 14 to the other side thereof.

In FIGURE 7 there is shown a modified fuel element 14'. The fuel element 14' comprises a wedge-shaped mass 15' which has radiused opposite ends 33, 34.

The mass 15' is encased in a stainless steel sheet metal sheath 35 which is initially made to enclose a volume larger than that of the mass 15', the internal wall of the sheath 35 being provided electrolytically with a nickel deposit to a thickness of 0.001" to 0.002".

The sheath 35 is folded in such a way as to produce a tail 36 and side walls 37, 38, and, after the mass 15' has been introduced into the sheath 35, the sheath 35 is collapsed against the mass 15' in the manner described above in relation to the embodiment of FIGS. 1–5. This collapsing causes the ends of the side walls 37, 38 remote from the tail 36 to lie alongside each other and they are then seam welded together, to a depth in the range 0.040" to 0.050", to form a tail 40.

As will be seen from FIGURE 7, the tails 36, 40 are disposed on the longitudinal centre line of the fuel element 14'.

After the tail 40 has been so formed, the mass 15' is bonded to the sheath 35 in the same manner as described above in relation to the embodiment of FIGS. 1–5.

It will be appreciated that the wedge shape of the fuel elements 14, 14' increases their surface area and therefore permits them to be given a substantially greater heat output per unit length at a given temperature (and a reduced internal temperature) to what they would have if they were cylindrical. Thus the wedge shape of the fuel elements 14, 14' may be such that the said heat output is twice what it would be if the fuel elements were cylindrical.

I claim:

1. A fuel element assembly for a nuclear reactor comprising inner and outer hollow concentric housing members defining an elongated annulus between them; a plurality of fuel elements disposed within the annulus in spaced relation from each other and from said housing members; each of said fuel elements comprising a wedge-shaped mass of fissile material tapering toward said inner housing member and extending along a substantial portion of said annulus, said wedge-shaped mass being encased in and metallically bonded to the internal wall of a sheet metal sheath, the metallic bond having a low neutron absorption and a melting point above the temperature to which the fuel element will be subjected in operation, the sheath being substantially free from chemical attack by the metallic bond at the said temperature, the sheath having a plurality of parts which are welded together and having projections extending therefrom into engagement with said inner and outer housing members so as to maintain said spaced relationship.

2. A fuel element as claimed in claim 1 wherein the metallic bond between each mass of fissile material and the said sheath comprises a nickel layer, said layer being diffusion-bonded to the said fissile material and the said sheath.

3. A fuel element as claimed in claim 2, the said fissile material containing one material selected from the group consisting of uranium mono-carbide, uranium nitride and uranium dioxide.

References Cited by the Examiner

UNITED STATES PATENTS

| | | | |
|---|---|---|---|
| 2,086,135 | 7/1937 | McIlvane | 29—474.4 |
| 2,871,555 | 2/1957 | Foster | 29—474.4 |
| 2,928,168 | 3/1960 | Gray | 176—91 |
| 2,934,483 | 4/1960 | Bostrom et al. | 176—89 |
| 2,938,846 | 5/1960 | Hix et al. | 29—498 |
| 2,949,416 | 8/1960 | Wheelock | 176—81 |
| 2,952,603 | 9/1960 | Boller et al. | 176—82 |
| 2,969,309 | 1/1961 | Finniston et al. | 176—82 |
| 3,049,486 | 8/1962 | Currier et al. | 176—69 |
| 3,129,140 | 4/1964 | Stohr et al. | 176—76 |

FOREIGN PATENTS

| | | |
|---|---|---|
| 232,778 | 1/1960 | Australia. |
| 1,206,300 | 2/1960 | France. |

(Other references on following page)

FOREIGN PATENTS

| | | |
|---|---|---|
| 1,257,647 | 2/1961 | France. |
| 790,389 | 2/1958 | Great Britain. |
| 802,998 | 10/1958 | Great Britain. |
| 823,364 | 11/1959 | Great Britain. |
| 873,370 | 7/1961 | Great Britain. |

OTHER REFERENCES

Nuclear Fuel Elements by Hausner et al., November 1959, pp. 14, 159 and 160 relied upon.

REUBEN EPSTEIN, *Primary Examiner.*

LEON D. ROSDOL, CARL D. QUARFORTH,
*Examiners.*